US010630356B2

(12) United States Patent
Kikkawa et al.

(10) Patent No.: US 10,630,356 B2
(45) Date of Patent: Apr. 21, 2020

(54) COMMUNICATION APPARATUS AND METHOD OF CONTROLLING THE SAME

(71) Applicant: CANON KABUSHIKI KAISHA, Tokyo (JP)

(72) Inventors: Teruki Kikkawa, Yokohama (JP); Katsumi Arisaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/173,085

(22) Filed: Oct. 29, 2018

(65) Prior Publication Data
US 2019/0140718 A1    May 9, 2019

(30) Foreign Application Priority Data
Nov. 8, 2017    (JP) ................ 2017-215897

(51) Int. Cl.
| H04B 17/345 | (2015.01) |
| H04B 7/0456 | (2017.01) |
| G06F 1/20 | (2006.01) |
| H04B 17/382 | (2015.01) |
| H04B 17/336 | (2015.01) |
| H04B 7/06 | (2006.01) |
| H04L 1/00 | (2006.01) |
| H04B 7/0413 | (2017.01) |

(52) U.S. Cl.
CPC ............ *H04B 7/0486* (2013.01); *G06F 1/20* (2013.01); *H04B 7/0602* (2013.01); *H04B 17/336* (2015.01); *H04B 17/345* (2015.01); *H04B 17/382* (2015.01); *H04L 1/00* (2013.01); *H04B 7/0413* (2013.01)

(58) Field of Classification Search
CPC .... G06F 1/20; H04B 1/00; H04B 1/10; H04B 1/38; H04B 7/00; H04B 7/02; H04B 7/04; H04B 7/0486; H04B 7/0602; H04B 17/00; H04B 17/336; H04B 17/345; H04B 17/382; H04L 1/00; H04L 1/02; H04L 26/06; H04L 27/28; H04W 4/00; H04W 72/04
USPC ....... 370/230, 252, 318, 320, 333, 352, 342; 375/219, 229, 260, 262, 267, 295, 316, 375/340; 455/67.11, 69, 150.1, 226.1, 455/283, 303, 522
See application file for complete search history.

(56) References Cited

U.S. PATENT DOCUMENTS

| 7,486,634 | B2 * | 2/2009 | Itoh ....................... H04L 1/0003 370/230 |
| 8,165,532 | B2 * | 4/2012 | Saito .................... H04B 7/0689 455/101 |
| 2011/0134987 | A1 * | 6/2011 | Watanabe ............ H04B 7/0814 375/229 |

(Continued)

FOREIGN PATENT DOCUMENTS

| JP | 2003-198669 A | 7/2003 |
| JP | 4476184 B | 6/2010 |

*Primary Examiner* — Shawkat M Ali
(74) *Attorney, Agent, or Firm* — Cowan, Liebowitz & Latman, P.C.

(57) ABSTRACT

A communication apparatus having a plurality of antennas, comprises a communication unit configured to communicate with an external apparatus with the plurality of antennas, a detection unit configured to detect a status of the communication apparatus, and a specifying unit configured to specify a noise component mixed in signals received from the external apparatus according to the status of the communication apparatus.

27 Claims, 13 Drawing Sheets

(56) References Cited

U.S. PATENT DOCUMENTS

2013/0210377 A1\* 8/2013 Kondo .................. H04B 1/126
455/150.1

\* cited by examiner

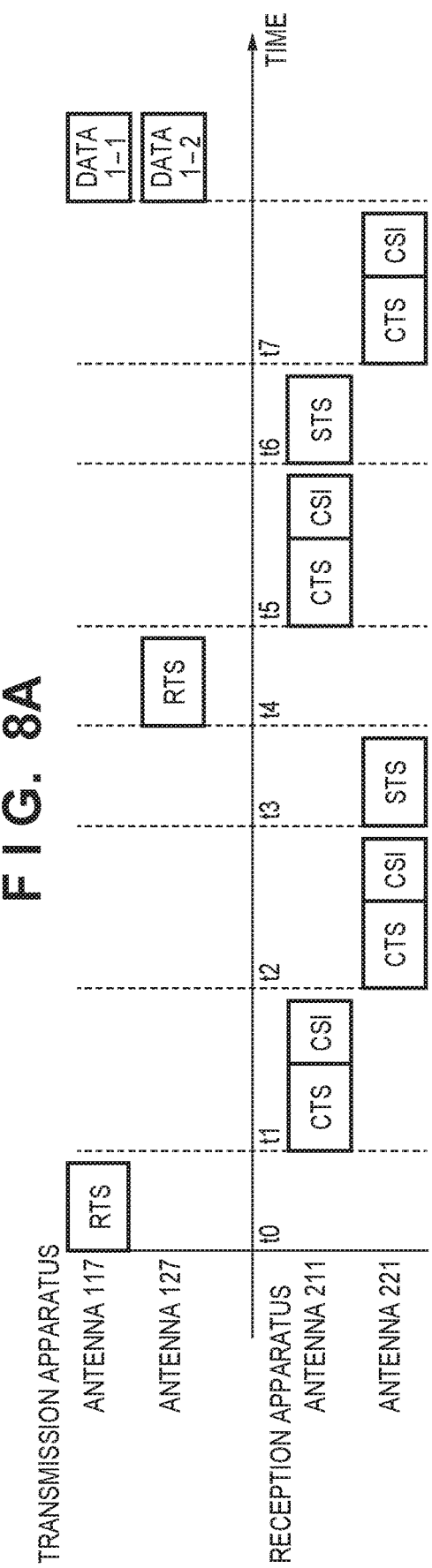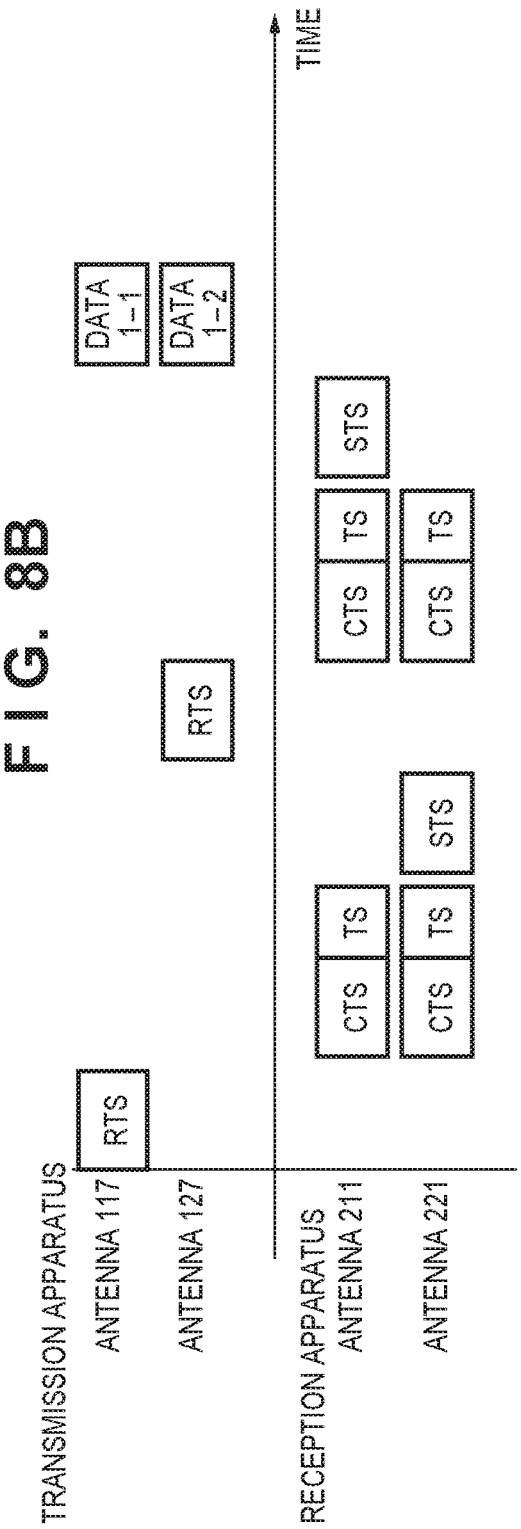

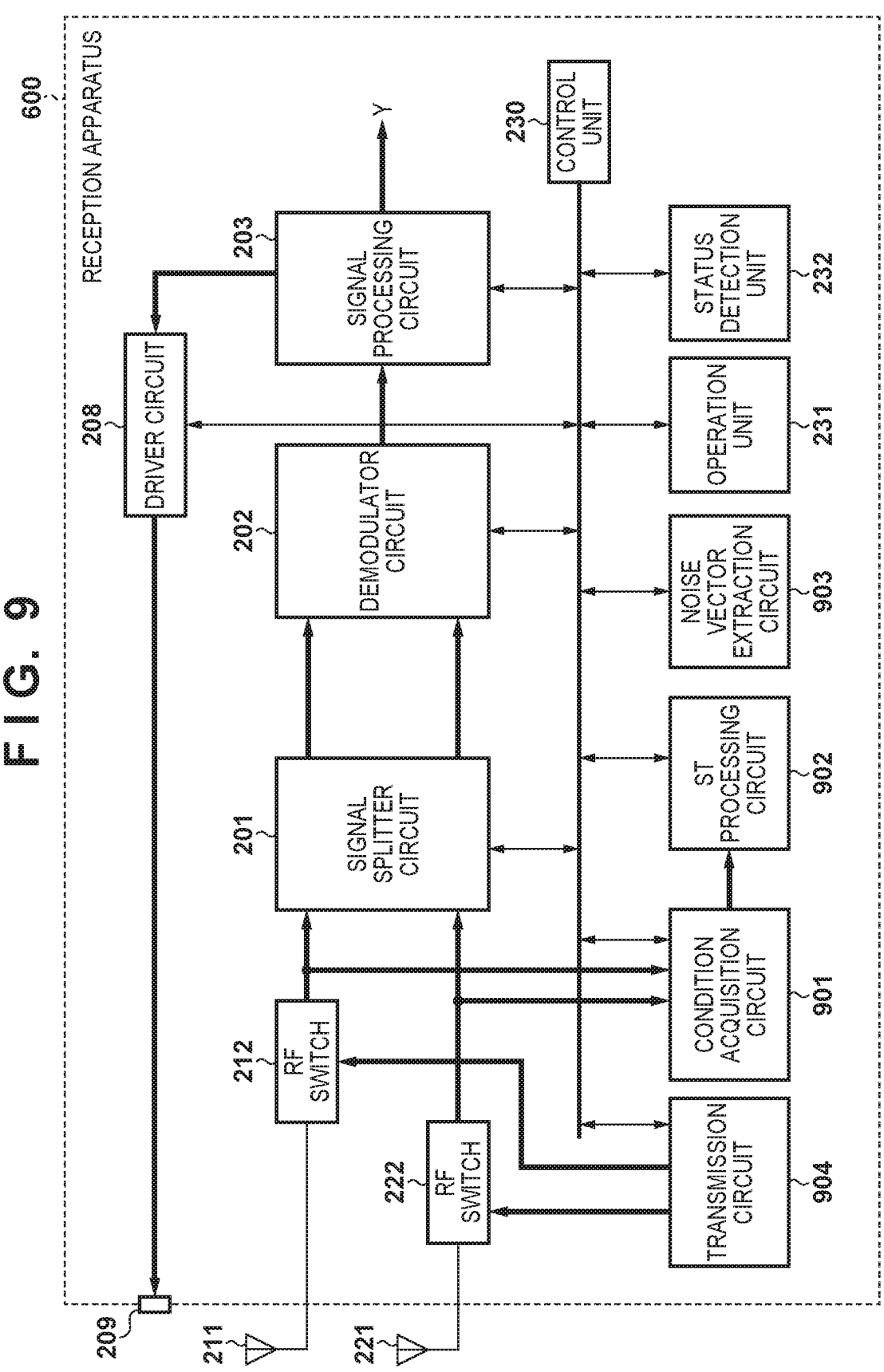

FIG. 11

| HT MCS Index | VHT MCS Index | NO. OF STREAMS | MODULATION METHOD | 20MHz | | 40MHz | | 80MHz | | 160MHz | |
|---|---|---|---|---|---|---|---|---|---|---|---|
| | | | | DATA RATE(Mbps) | | DATA RATE(Mbps) | | DATA RATE(Mbps) | | DATA RATE(Mbps) | |
| | | | | 800nsGI | 400nsGI | 800nsGI | 400nsGI | 800nsGI | 400nsGI | 800nsGI | 400nsGI |
| 0 | 0 | 1 | BPSK | 6.5 | 7.2 | 13.5 | 15 | 29.3 | 32.5 | 58.5 | 65 |
| 1 | 1 | 1 | QPSK | 13 | 14.4 | 27 | 30 | 58.5 | 65 | 117 | 130 |
| 2 | 2 | 1 | QPSK | 19.5 | 21.7 | 40.5 | 45 | 87.8 | 97.5 | 175.5 | 195 |
| 3 | 3 | 1 | 16-QAM | 26 | 28.9 | 54 | 60 | 117 | 130 | 234 | 260 |
| 4 | 4 | 1 | 16-QAM | 39 | 43.3 | 81 | 90 | 175.5 | 195 | 351 | 390 |
| 5 | 5 | 1 | 64-QAM | 52 | 57.8 | 108 | 120 | 234 | 260 | 468 | 520 |
| 6 | 6 | 1 | 64-QAM | 58.5 | 65 | 121.5 | 135 | 263.3 | 292.5 | 526.5 | 585 |
| 7 | 7 | 1 | 64-QAM | 65 | 72.2 | 135 | 150 | 292.5 | 325 | 585 | 650 |
| — | 8 | 1 | 256-QAM | 78 | 86.7 | 162 | 180 | 351 | 390 | 702 | 780 |

F I G. 13
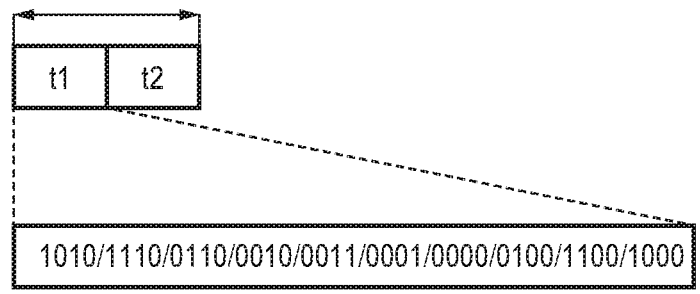

COMMUNICATION APPARATUS AND METHOD OF CONTROLLING THE SAME

BACKGROUND OF THE INVENTION

Field of the Invention

The present invention relates to a technique for using a plurality of antennas to realize high-speed communication.

Description of the Related Art

In recent years, MIMO (Multi-Input Multi-Output) has been used in small-sized mobile electronic devices in order to realize high-speed communication, MIMO is a technique for using a plurality of antennas to realize high-speed communication. A certain degree of unevenness in noise distribution constantly occurs in an electronic device with built-in antennas. For example, a difference constantly occurs in the amount of noise between an antenna located close to hardware that is a noise source and an antenna not located close to such hardware. Specifically, as small-sized mobile electronic devices have a limited interior space, there are cases in which a SDI or HDMI® or other high-speed interface is disposed in close proximity to an antenna. In this case, the input and output signals of the high-speed interface become noise sources to create a difference in the amount of noise between the antennas in the device. Such an uneven noise distribution within a device is called self-interference noise (referred to as intra-device noise hereinafter).

Japanese Patent Laid-Open No. 2003-198669 describes a method for avoiding the use of the antenna closer to a noise source in a device equipped with a wireless module with a plurality of antennas. Japanese Patent No. 4476184 contemplates a thermal noise as the noise received by MIMO and describes a method for selecting an effective antenna among a plurality of antennas provided therein by considering the effect of the thermal noise.

However, as Japanese Patent Laid-Open No. 2003-198669 uses effectively only one antenna when two antennas are provided, high-speed communication of MIMO cannot be realized. In addition, Japanese Patent No. 4476184 contemplates thermal noise as the only noise while failing to consider the above-described uneven noise distribution.

SUMMARY OF THE INVENTION

The present invention has been made in consideration of the aforementioned problems, and realizes a technique that provides high-speed communication to reduce the effect of the noise unevenly distributed in the apparatus when using a plurality of antennas to communicate.

In order to solve the aforementioned problems, the present invention provides a communication apparatus having a plurality of antennas, comprising: a communication unit configured to communicate with an external apparatus with the plurality of antennas; a detection unit configured to detect a status of the communication apparatus; and a specifying unit configured to specify a noise component mixed in signals received from the external apparatus according to the status of the communication apparatus.

In order to solve the aforementioned problems, the present invention provides a control method of a communication apparatus having a plurality of antennas, comprising: communicating with an external apparatus with the plurality of antennas; detecting a status of the communication apparatus; and specifying a noise component mixed in signals received from the external apparatus according to the status of the communication apparatus.

In order to solve the aforementioned problems, the present invention provides a non-transitory computer-readable storage medium storing a program for causing a computer to function as a communication apparatus having a plurality of antennas, comprising: a communication unit configured to communicate with an external apparatus with the plurality of antennas; a detection unit configured to detect a status of the communication apparatus; and a specifying unit configured to specify a noise component mixed in signals received from the external apparatus according to the status of the communication apparatus.

According to the present invention, high-speed communication can be realized that reduces the effect of the noise unevenly distributed in the apparatus when using a plurality of antennas to communicate.

Further features of the present invention will become apparent from the following description of exemplary embodiments (with reference to the attached drawings).

BRIEF DESCRIPTION OF THE DRAWINGS

FIGS. 8A and 8B are timing charts of data transmission and reception according to the second embodiment.

FIG. 9 is a diagram showing the configuration of the reception apparatus of the second embodiment.

FIG. 11 is a diagram showing exemplary combinations of communication conditions of the reception apparatus according to the second embodiment.

FIG. 13 is a chart showing an exemplary configuration of the packet of training signal according to the second embodiment.

DESCRIPTION OF THE EMBODIMENTS

Figure 1:
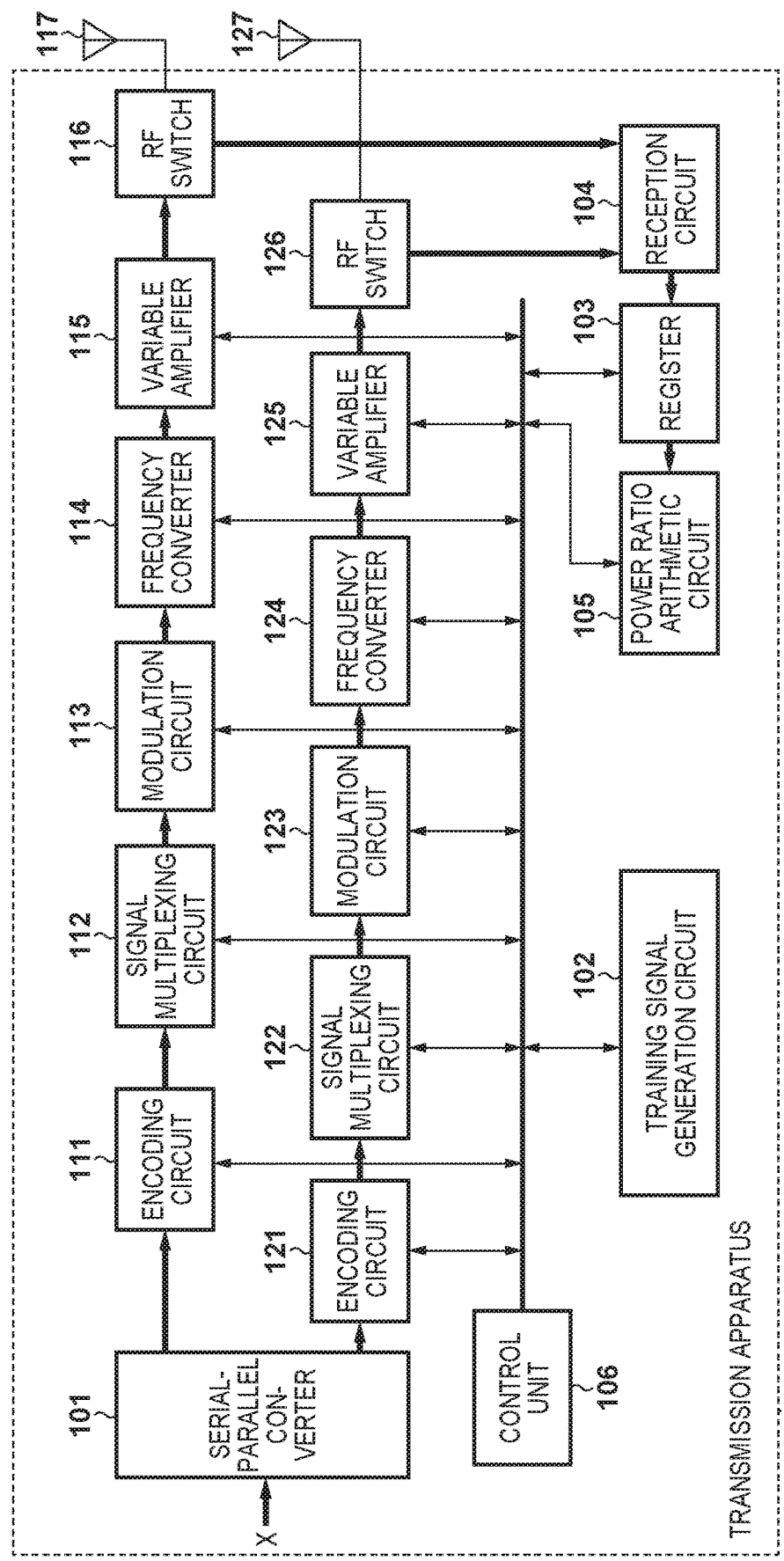
FIG. 1 is a block diagram showing the configuration of a transmission apparatus according to a first embodiment of the present invention.

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

<Description of the Principle of Operation>

First, the principle of operation of MIMO, which uses a plurality of antennas to perform high-speed communication, will be described hereinafter.

The following describes an example in which the transmission apparatus and the reception apparatus each have two antennas to provide two transmission series 1 and 2 and two reception series 1 and 2. As used herein, the superscript T indicates vector transposition.

The transmission signal, the reception signal, and the noise component are represented by the transmission signal vector X, the reception signal vector Y, and the noise vector N as below. As used herein, X1 and X2 denote the transmission signal vectors of the series 1 and 2, Y1 and Y2 denote the reception signal vectors of the series 1 and 2, and N1 and N2 denote the noise vectors of the series 1 and 2.

$$X=[X1,X2]^T$$

$$Y=[Y1,Y2]^T$$

$$N=[N1,N2]^T$$

MIMO wireless communication can be modeled by the expression 1 where H denotes the transfer function representing the characteristics of the transmission paths between the transmission antennas and the reception antennas.

$$Y=H \cdot X+N \quad \text{(Exp. 1)}$$

First, if a training signal, which is a known transmission signal, is sent on the assumption that no intra-device noise is mixed in, the expression (2) is obtained from the expression (1), where Xref denotes the transmission signal and Yref denotes the reception signal vector.

$$Yref=H \cdot Xref \quad \text{(Exp. 2)}$$

The elements of the transfer function H and the inverse matrix $G=H^{-1}$ can be found by solving the expression (1) and the expression (2). Here, the elements of the inverse matrix G can be represented by the expression (3) below, where [ ] in the expression (3) denotes a matrix.

$$G = \begin{bmatrix} g11 & g12 \\ g21 & g22 \end{bmatrix} \quad \text{(Exp. 3)}$$

Next, a case is considered where the transmission signal vector X is transmitted and the reception apparatus receives the reception signal vector Y, on which the internal device noise is superimposed. In this case, multiplying both sides of the expression (1) by G gives the expression (4):

$$G \cdot Y = X + G \cdot N \quad \text{(Exp. 4)}$$

where the left-hand side represents the actual value that can be calculated by the reception apparatus and should be the value of the transmission signal vector. However, as can be seen, the right-hand side of the expression has a second term in addition to the transmission vector X. The first term represents the signal component and the second term represents the noise component.

It is assumed that the noise component is mainly an internal device noise and that the source of the internal device noise is located in close proximity to the antenna of the reception series 1. In such a case, the noise vector is represented by the expression (5), where α and β are the noise coefficients or the ratios of the noise mixed in the antennas of the reception series 1 and 2 with respect to the amount of the internal device noise Ns:

$$N=[\alpha Ns, \beta Ns]^T \quad \text{(Exp. 5)}$$

where α>β.

Next, the S/N ratio, which is the ratio of the noise signal to the transmission signal of each transmission series, is obtained from the right-hand side of the expression (5). Now, the S/N ratio of the transmission series 1 is represented by the expression (6) and the S/N ratio of the transmission series 2 is represented by the expression (7), where E[ ] represents the expected value and * represents the operator of the complex conjugate:

$$E[X1 \cdot X1^*]/E[(g11 \cdot \alpha Ns+g12 \cdot \beta Ns) \cdot (g11 \cdot \alpha Ns+g12 \cdot \beta Ns)^*] \quad \text{(Exp. 6)}$$

$$E[X2 \cdot X2^*]/E[(g21 \cdot \alpha Ns+g22 \cdot \beta Ns) \cdot (g21 \cdot \alpha Ns+g22 \cdot \beta Ns)^*] \quad \text{(Exp. 7)}$$

Normally, as the electrical power of the transmission signal is set at the same level for both transmission series at the beginning of communication, the numerators $E[X1 \cdot X1^*]$ and $E[X2 \cdot X2^*]$ of both of the expressions (6) and (7) are the same. Additionally, as Ns is a common term in the denominator, the ratio of the S/N ratios of the transmission series (the noise ratio) is given as the ratio of $(g11 \cdot g11^*)\alpha^2 + (g12 \cdot g12^*)\beta^2$ for the transmission series 1 to $(g21 \cdot g22^*)\alpha^2 + (g21 \cdot g22^*)\beta^2$ for the transmission series 2 by extracting the denominators only. In other words, that ratio is represented by the expression (10), which is the ratio of the expression (8) to the expression (9):

$$|g11|^2 \cdot \alpha^2 + |g12|^2 \cdot \beta^2 \text{ (for the transmission series 1)} \quad \text{(Exp. 8)}$$

$$|g21|^2 \cdot \alpha^2 + |g22|^2 \cdot \beta^2 \text{ (for the transmission series 2)} \quad \text{(Exp. 9)}$$

$$\{|g11|^2 \cdot \alpha^2 + |g12|^2 \cdot \beta^2\}/\{|g21|^2 \cdot \alpha^2 + |g22|^2 \cdot \beta^2\} \quad \text{(Exp. 10)}$$

Furthermore, the transmission capacity of each transmission series is approximately proportional to its S/N ratio, so that the smaller the noise vector value is for each transmission series, the larger the transmission capacity is.

In particular, if the ratio between the noise coefficients β and β of the reception series 1 and 2, respectively, is sufficiently smaller than 1 (i.e., $\beta/\alpha \ll 1$), the expression (8) and the expression (9), if divided by $\alpha^2$, become the expression (11) and the expression (12) since $\beta/\alpha \approx 0$:

$$|g11|^2 + |g12|^2 \cdot (\beta/\alpha)^2 \approx |g11|^2 \text{ (for the transmission series 1)} \quad \text{(Exp. 11)}$$

$$|g21|^2 + |g22|^2 \cdot (\beta/\alpha)^2 \approx |g21|^2 \text{ (for the transmission series 2)} \quad \text{(Exp. 12)}$$

Accordingly, the power level of the transmission signal should be set in a manner that can provide a predetermined S/N ratio or higher in both series. In reality, as there is a limit to the amount of power that can be supplied to the wireless communication module, it is not possible to increase the power without limitation. Due to this, in this embodiment, power is used most efficiently by controlling the output level of the transmission signal of each series to make the S/N ratio of each series approximately the same.

In this case, the current noise ratio of the transmission series is as represented by the expression (13), and this ratio is transmitted from the reception apparatus to the transmission apparatus:

$$|g11|_2/|g21|^2 \quad \text{(Exp. 13)}$$

Based on this noise ratio, the transmission apparatus adjusts the transmission signal vector X1 of the series 1 and the transmission signal vector X2 of the series 2 under the condition of keeping the total electrical energy constant to limit the transmission power so as to be represented by the expression (14) such that the S/N ratio of each series is controlled to be approximately the same. That is, control is performed to allow reconstruction of data after error correction in both of the transmission series in order to prevent the S/N ratio of one series from deteriorating extremely.

$$|X1|^2/|X2|^2 \propto |g11|^2/|g21|^2 \qquad \text{(Exp. 14)}$$

Now, with A representing the transmission power of each series in the expressions below, and by making adjustments under the condition of keeping the total electrical energy constant as described below, the transmission power of each series can be variably controlled under the condition of keeping the total electrical energy constant:

$$A \to (1+k)A \text{ (for the transmission series 1)}$$

$$A \to (1-k)A \text{ (for the transmission series 2)}$$

Now, let m be the value corresponding to the right-hand side of the expression (14), then $$(1+k)/(1-k)=m$$

Therefore, the transmission power of each series can be adjusted by using the value k of the expression (15).

$$k=(m-1)/(m+1) \qquad \text{(Exp. 15)}$$

In this embodiment, the exemplary noise ratios are the quotients represented by the expression (10) and the expression (13). However, the present invention is not limited to these; equivalents to the expression (8) and the expression (9) may also be transmitted to the transmission apparatus.

Additionally, if three or more antennas are provided, the noise ratio may be calculated using equivalents to the expression (8) and the expression (9). Alternatively, it may be calculated by using an antenna as a reference. For example, a noise wireless corresponding to the expression (10) may be obtained for each of a pair of antennas A and B and a pair of antennas A and C.

First Embodiment

A wireless communication system according to a first embodiment of the present invention will be described hereinafter with reference to FIGS. 1-5.

In the system of the first embodiment, the transmission apparatus is, for example, a small-sized electronic device, such as a mobile telephone, a smart phone, which is one type of mobile telephone, or a tablet terminal, and the reception apparatus is, for example, an image capture apparatus, such as a video camera. The transmission apparatus transmits various data, such as control data and image data, to the reception apparatus, which in turn receives the control data and image data to perform image capturing control and playback control.

The transmission apparatus and the reception apparatus each have two antennas and are capable of transmitting using each of the antennas. The transmission apparatus divides the digital data outputted from a signal processing circuit (not shown) that is to be transmitted (referred to as transmission data hereinafter) into a plurality of data streams and transmits the data streams from each of the antennas provided in the transmission apparatus by space division multiplexing. The reception apparatus separates the data streams from the signals received by each of the antennas provided in the reception apparatus and reconstructs the transmission data. In this way, by using a plurality of antennas to transmit and receive data, the amount of communication data per unit time (throughput) can be increased to realize high-speed communication.

In MIMO, the transmission apparatus performs serial-parallel conversion on transmission data for serial transmission to convert it to parallel data at each symbol cycle slower than the transmission rate and distribute it to the series of each antenna. The transmission apparatus then modulates and transmits the distributed data from each antenna. Meanwhile, the reception apparatus separates and decodes the data streams received from the antennas to reconstruct the transmission data.

As described above, the wireless communication system of this embodiment obtains the transfer function H, which represents the characteristics of the transmission paths between the transmission antenna and the reception antenna, by transmitting and receiving a known transmission signal (referred to as a training signal hereinafter) between the transmission apparatus and the reception apparatus. Then, this system controls the output level of the transmission signal by calculating the noise ratio using noise coefficients α and β according to the change in the operational status of the reception apparatus.

<Apparatus Configuration>

First, the configurations and functions of the transmission apparatus and the reception apparatus of the first embodiment will be described with reference to FIGS. 1 and 2.

FIG. 1 is a block diagram that illustrates the configuration of the transmission apparatus provided with a plurality of antennas according to the first embodiment. FIG. 2 is a block diagram that illustrates the configuration of the reception apparatus provided with a plurality of antennas according to the first embodiment.

The communication apparatuses that constitute the wireless communication system of this embodiment are capable of functioning as a transmission apparatus or a reception apparatus. In the following description, however, the apparatus that mainly transmits transmission data or user data will be referred to as the transmission apparatus while the apparatus that mainly receives the data will be referred to as the reception apparatus. The transmission apparatus and the reception apparatus of this embodiment each use two antennas that can be switched between transmission and reception to perform MIMO operation.

First, the configuration and function of the transmission apparatus 100 will be described hereinafter with reference to FIG. 1.

The control unit 106 includes a CPU, a ROM, and a RAM, and performs control over the overall operation of the transmission apparatus 100 by using the RAM as its work memory according to the program stored in the ROM.

The serial-parallel converter 101 converts the transmission data serially transmitted from the signal processing circuit (not shown) to parallel data and distributes it to the encoding circuit ill of a first series and the encoding circuit 121 of a second series. The encoding circuit 111 of the first series and the encoding circuit 121 of the second series encode the parallel data outputted from the serial-parallel converter 101.

The training signal generation circuit 102 generates the training signal, which is a known transmission signal described above in the Principle of Operation section. In particular, before normal data is transmitted, the training signal generation circuit 102 generates a predetermined transmission signal vector Xref in two series at a constant cycle, and transmits it to the signal multiplexing circuit 112 of the first series and the signal multiplexing circuit 122 of the second series.

As described below in connection with FIG. 3A, the signal multiplexing circuits 112 and 122 select the training signal sent by the training signal generation circuit 102 only during the training signal period (the training period) at the start of the fixed cycle. Additionally, after the fixed cycle, the signal multiplexing circuits 112 and 122 operate to select the signals from the encoding circuit 111 and the encoding circuit 121, respectively.

FIG. 3A shows one example of the training signal generated by the training signal generation circuit 102. A short preamble portion and a long preamble portion are provided before the user data region, and the user data region is provided after a system information region that includes information, such as the transmission speed. The short preamble portion is used for timing detection and AFC (Auto Frequency Control). The long preamble portion is used for fine-timing AFC and estimating the transmission paths. In other words, the training signal generation circuit 102 generates the short preamble portion and the long preamble portion.

The modulation circuits 113 and 123 modulate the signals outputted from the signal multiplexing circuits 112 and 122 by OFDM (Orthogonal Frequency Division Multiplexing).

The frequency converters 114 and 124 converts the frequencies of the modulated signals outputted from the modulation circuits 113 and 123 to have predetermined center frequencies.

The variable amplifiers 115 and 125 change output levels of the transmission power of the frequency conversion signals outputted by the modulation circuits 113 and 123 according to the setting value outputted by the register 103. The transmission signals outputted by the variable amplifiers 115 and 125 are radiated into the transmission paths from the antennas 117 and 127 via the RF switches 116 and 126, respectively.

The RF switches 116 and 126 switch the function of the antennas 117 and 127, respectively, between transmission and reception. To receive signals, the RF switches 116 and 126 are switched to connect the antennas 117 and 127 to the reception circuit 104. Upon receiving data about the noise ratio from the reception apparatus 200, which will be described below, the reception circuit 104 stores the received data in the register 103.

The power ratio arithmetic circuit 105 calculates the power ratio so that the ratio of the transmission power of one antenna to that of the other antenna corresponds to the noise ratio stored in the register 103. Furthermore, the power ratio arithmetic circuit 105 outputs an operating voltage to control the gains of the variable amplifiers 115 and 125, and the gains are set for the variable amplifiers 115 and 125 according to the above-described operating principle.

Next, the configuration and function of the reception apparatus 200 will be described hereinafter with reference to FIG. 2.

The control unit 230 includes a CPU, a ROM, and a RAM, and performs control over the overall operation of the reception apparatus 200 by using the RAM as its work memory according to the program stored in the ROM.

The RF switches 212 and 221 switch the function of the antennas 211 and 221, respectively, between transmission and reception.

The signals received by the antennas 211 and 221 are inputted into the signal splitter circuit 201 and the transmission path estimation circuit 204 via the RF switches 212 and 222, respectively.

The transmission path estimation circuit 204 detects the preamble portions of the training signal. The transmission path estimation circuit 204 calculates the elements of the transfer function H, which represent the characteristics of the transmission paths, from the reception signal vector Yref and the known transmission signal vector Xref in the long preamble portion, which has a constant pattern, and outputs the elements to the inverse matrix arithmetic circuit 205.

The inverse matrix arithmetic circuit 205 calculates the elements of the inverse matrix G from the elements of the transfer function H outputted by the transmission path estimation circuit 204. The inverse matrix arithmetic circuit 205 additionally outputs the value of each element of the inverse matrix G to the signal splitter circuit 201 and the control unit 230 during the training period.

The signal splitter circuit 201 uses the value of each element of the inverse matrix G to estimate the transmission signal for each series and outputs it to the demodulator circuit 202.

The demodulator circuit 202 decodes the transmission data from the estimated transmission signals and outputs it to the signal processing circuit 203.

The signal processing circuit 203 reconstructs video and other data from the decoded transmission signal. The signal processing circuit 203 additionally generates data to be outputted to the external connection members 209 according to the operation mode of the reception apparatus 200 and outputs the data to the driver circuit 208.

The driver circuit 208 outputs the data generated by the signal processing circuit 203 to the external connection members 209. The external connection members 209 comprise video input/output terminals, such as an SDI terminal or an HDMI terminal, that can be connected to an external apparatus or a memory card slot, into which a record medium can be removably inserted.

The noise coefficient holder circuit 206 is a type of memory for holding the noise coefficients $\alpha$ and $\beta$, which have been described in the Principle of Operation section. FIG. 3B shows an example of a table of noise coefficients held by the noise coefficient holder circuit 206. In this embodiment, the signal input and output of an SDI terminal and an HDMI terminal that serve as the external connection members 209 operate exclusively, and the SDI terminal is disposed adjacent to the antenna 211 and the HDMI terminal is disposed adjacent to the antenna 221. In this embodiment, the noise amounts are measured in advance according to the signal input and output status of each external connection member 209 to calculate the values of the noise coefficients shown in FIG. 3B. As for the noise coefficients of the external connection members 209, FIG. 3B shows the noise coefficients according to the signal input and output status of the SDI terminal (the terminal 1), the noise coefficients that include the effects of the HDMI terminal (terminal 2), and the noise coefficients according to the version of the memory card (the communication speed).

As can be seen from FIG. 3B, the faster the signal input and output status of the SDI terminal (the terminal 1), the greater the value of a becomes. In addition, as $\alpha$ and $\beta$ have different values between the 2.4 G bandwidth and the 5 G bandwidth, the table holds different values of $\alpha$ and $\beta$ for each of these radio-frequency bandwidths. Although FIG. 3B shows representative values for each of the 2.4 G bandwidth and the 5 G bandwidth, they may be specified for each radio channel. Moreover, although an SDI terminal, an HDMI terminal, and a memory card are exemplified as the noise sources in this embodiment, other signals can also be noise sources.

If the signal input and output of the SDI terminal and the HDMI terminal are operable simultaneously, a new line may be added to the table of FIG. 3B where values may be held that can be read when the terminals operate simultaneously. The operation to choose which value to read out will be described below. Moreover, if a plurality of memory card slots is provided, the table of FIG. 3B may be expanded according to the presence or absence and the standards of the slots.

The control unit 230 receives the values that represent the elements of the inverse matrix G calculated by the inverse matrix arithmetic circuit 205 and the values read out from the noise coefficient holder circuit 206.

The operation unit 231 includes a physical operation member that accepts user operation, a touch panel, an electronic switch, etc., for providing input signals corresponding to user operation to the control unit 230. The status detection unit 232 detects the status of the reception apparatus 200 and the change in the status and notifies the control unit 230 accordingly. The status and the change in the status of the reception apparatus 200 are, for example, the operation mode of the reception apparatus 200, whether or not a cable is connected to at the external connection members 209 or the presence or absence of change in the settings of the external connection members 209, and the conditions (1)-(10) described below in connection with a second embodiment. While the operation of the control unit 230 will be described in detail below, the control unit 230 calculates the noise ratio from the value of each element of the inverse matrix and the values of the noise coefficients as described in the Principle of Operation section and output these to the transmission circuit 210. The transmission circuit 210 is connected to the antennas 211 and 221 via the RF switches 212 and 222 to transmit data about the noise ratio to the transmission apparatus 100 at predetermined timing. The transmission apparatus 100 operates as described above.

<Description of Operation>

First noise specifying processing by the reception apparatus 200 according to this embodiment will be described hereinafter with reference to FIG. 4.

After the reception apparatus 200 receives the training signal shown in FIG. 3A, the inverse matrix arithmetic circuit 205 calculates the inverse matrix during the training period. Furthermore, at the end of the training period, an interrupt signal is inputted to the control unit 230 to start the processing of FIG. 4.

Figure 4:
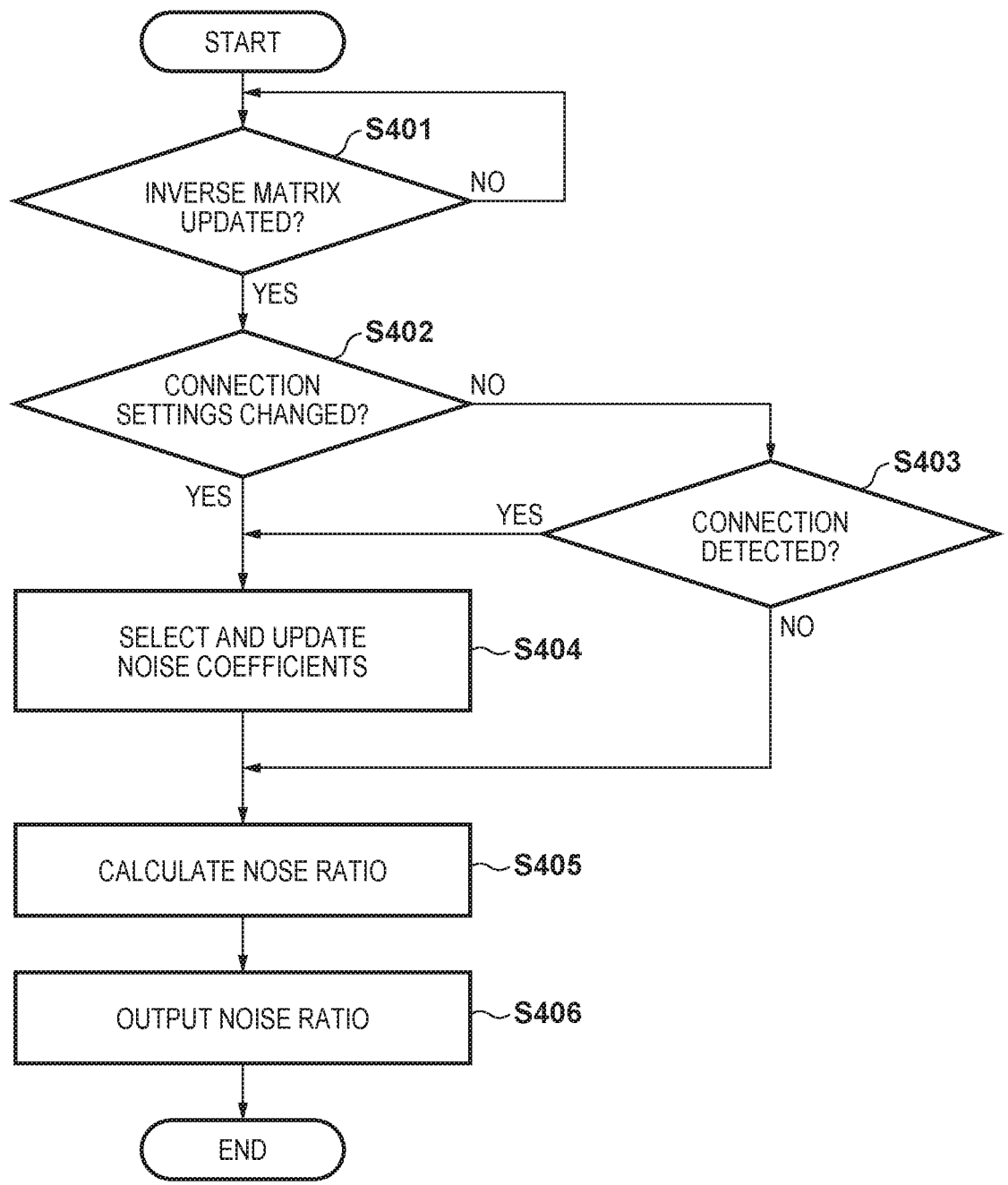
FIG. 4 is a flowchart showing the noise specifying processing performed by the reception apparatus of the first embodiment.

The process shown in FIG. 4 is implemented by a program stored in the ROM that is read to the RAM and executed by the control unit 230.

In Step S401, the control unit 230 receives the value of each element of the inverse matrix from the inverse matrix arithmetic circuit 205 and determines whether or not it has been updated by comparing it with the value of the element of the inverse matrix already stored in the ROM. In this embodiment, it is determined that the value has been updated if the result of the comparison indicates a change greater than or equal to a predetermined difference. If determining that the value has not been updated, the control unit 230 terminates the process. If determining that the value has been updated, however, the control unit 230 advances the process to Step S402.

In Step S402, the control unit 230 determines whether or not any change in the settings has been made in the external connection members 209 according to the input signal from the operation unit 231. If determining that a change has been made in the settings, the control unit 230 advances the process to Step S404. If determining that no change has been made in the settings, the control unit 230 advances the process to Step S403.

In Step S403, the control unit 230 determines whether or not the status detection unit 232 has detected a connection status of the external connection members 209. The control unit 230 advances the process to Step S405 if connection status is detected and advances the process to Step S404 if connection status is not detected.

In Step S404, the control unit 230 selects, based on the settings and the connection status of the external connection members 209, the values of noise coefficients appropriate for the present state from the table that is shown in FIG. 3B and held in the noise coefficient holder circuit 206, and updates the value stored in the RAM to the selected value.

In Step S405, the control unit 230 calculates the noise ratio as described in the Principle of Operation section from the values of the noise coefficients selected in Step S404 and the value of each element of the inverse matrix calculated by the inverse matrix arithmetic circuit 205.

In step S406, the control unit 230 outputs the noise ratio calculated in Step S405 to the transmission circuit 210. The transmission circuit 210 transmits the noise ratio to the transmission apparatus 100 received from the control unit 230 via the antennas 211 and 221 at predetermined timing and terminates the process.

The following describes the case in which the SDI output of the reception apparatus 200 is 12G-SDI as applied to the process of FIG. 4.

If the transfer function H, which represents the propagation paths, detected in the training signal is:

$$H = \begin{bmatrix} 1.0 & 0.5 \\ 0.4 & 0.9 \end{bmatrix}$$

then, the inverse matrix arithmetic circuit 205 calculates as an inverse matrix G:

$$G = (1/0.7) \times \begin{bmatrix} 0.9 & -0.5 \\ -0.4 & 1.0 \end{bmatrix} = \begin{bmatrix} 1.29 & -0.71 \\ -0.57 & 1.43 \end{bmatrix}$$

While the transfer function H and the inverse matrix G contain complex numbers, they are represented herein by real numbers to simplify the description. Note that [ ] in the transfer function H and the inverse matrix G denote matrices.

Next, if the value in the first line of the table of FIG. 3B is selected in Step S404 of FIG. 4, α=10.0 and β=1.2 are selected if the radio frequency is in the 2.4 G bandwidth.

As the expressions (8)-(10) are calculated in Step S405, the expression (8) gives 167.1, the expression (9) gives 35.4, and the expression (8) gives 4.72 in the case of the foregoing exemplary noise coefficients and inverse matrix. Although the values of the expressions (8) and (9) may be transmitted to the transmission apparatus 100, the value of the expression (10) is transmitted in this case.

In the transmission apparatus 100, the transmission signals of the two transmission series have the same initial output level of 10 dBm at the start of the communication. Solving the expression (15), which represents the condition of keeping the total electrical energy constant, gives k=0.65. As this translates into a multiplication of 1.65 times for the series 1 and a multiplication of 0.35 times for the series 2, the transmission power of the two transmission series are adjusted as follows upon conversion to dBs:

10 dB→14.3 dB (for the transmission series 1)

10 dB→0.9 dB (for the transmission series 2)

Figure 5:
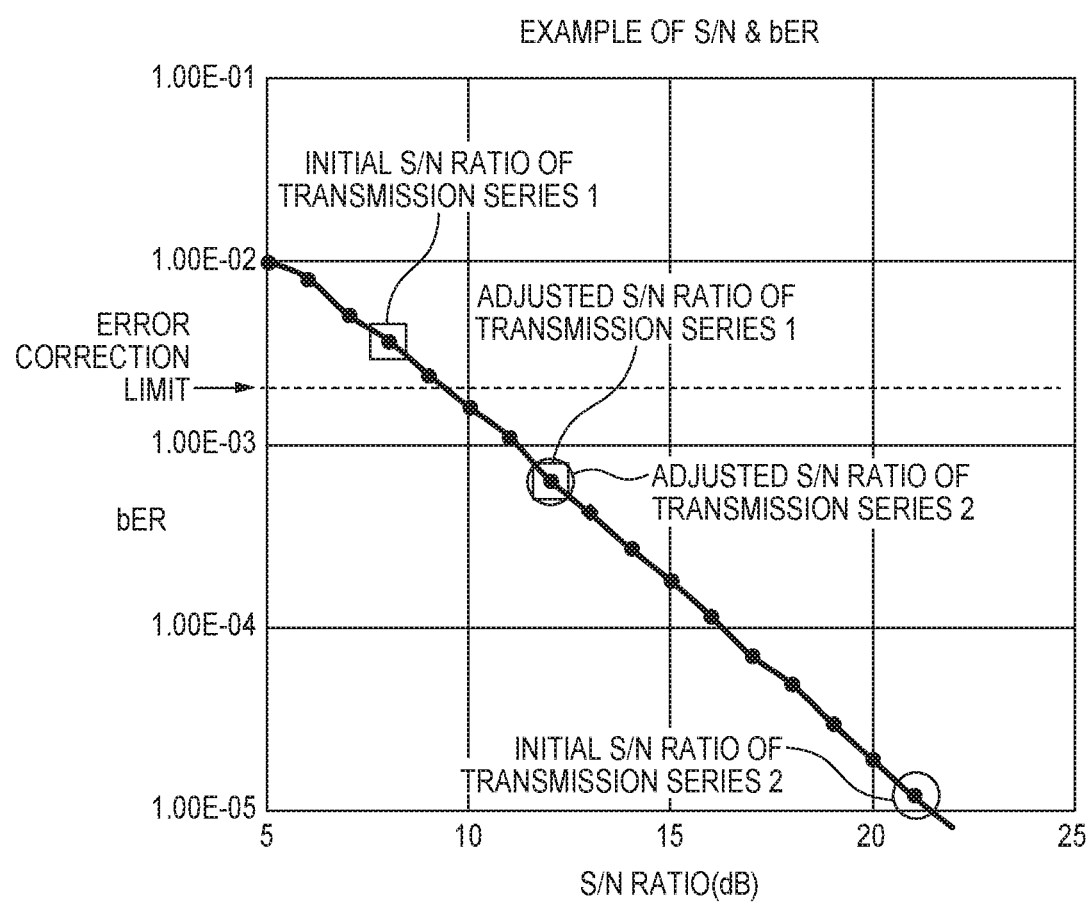
FIG. 5 is a chart showing the improvement in an error rate according to the first embodiment.

In this case, as shown in FIG. 5, the initial S/N ratios of the transmission series estimated by the reception apparatus 200 were:

8 dB (for the transmission series 1), and 21 dB (for the transmission series 2)

As the transmission signal component S changes as a result of the foregoing adjustments, the above ratios become:

12.3 dB (for the transmission series 1), and 11.9 dB (for the transmission series 2)

This lowers the S/N ratio of each series below the system's error correction limit of 1.00E-03, thus maintaining the communication in an appropriate status.

In this embodiment, the noise ratio is recalculated by detecting the change in the output levels of the transmission signals and the connection status of the terminals. Alternatively, the insertion or removal of a storage medium may be used as a trigger for recalculation.

Additionally, in this embodiment, while the inverse matrix is calculated by the dedicated inverse matrix arithmetic circuit 205, the control unit 230 may also perform this calculation. Also, while the noise ratio is calculated by the reception apparatus 200, the selected noise coefficients may alternatively be sent to the transmission apparatus 100 as is along with the value of each element of the inverse matrix. In that case, the transmission apparatus 100 may perform that calculation at a dedicated circuit or at the control unit 106 of the transmission apparatus 100. Also, while the distribution of the transmission power between the series is obtained under the condition of keeping the total electrical energy constant for the transmission apparatus 100, the distribution may be obtained under the condition of an upper limit set for each series only.

Second Embodiment

A wireless communication system according to a second embodiment of the present invention will be described hereinafter with reference to FIGS. 6-13.

In the first embodiment, the first noise specifying processing has been described in which the transmission apparatus 100 transmits a training signal, which is a known transmission signal, to the reception apparatus 200, which in turn calculates a noise ratio using the noise coefficients according to the change in the operational status of the apparatus. Alternatively, in the second embodiment, a second noise specifying processing is performed in which a training signal is sent and received between the antennas of the reception apparatus to extract the noise vector of each antenna.

Furthermore, by performing the second noise specifying processing after the first noise specifying operation, the internal device noise can be ascertained more accurately than in the first embodiment, resulting in enhanced S/N ratios. In the following description, it is assumed that the second noise specifying processing is performed after the first noise specifying processing. However, only one of the first noise specifying processing and the second noise specifying processing may be performed, or the first noise specifying processing may be performed after the second noise specifying processing.

In the following description, common members to the first embodiments are designated by like reference symbols and description thereof is omitted.

<System Configuration>

The system configuration of the second embodiment will be described hereinafter with reference to FIG. 6.

In addition to sending and receiving a training signal between the transmission apparatus 100 and the reception apparatus 600, the wireless communication system of the second embodiment detects the noise vectors as the internal device noise by sending and receiving a training signal between the plurality of antennas 211 and 221 of the reception apparatus 600.

Figure 2:
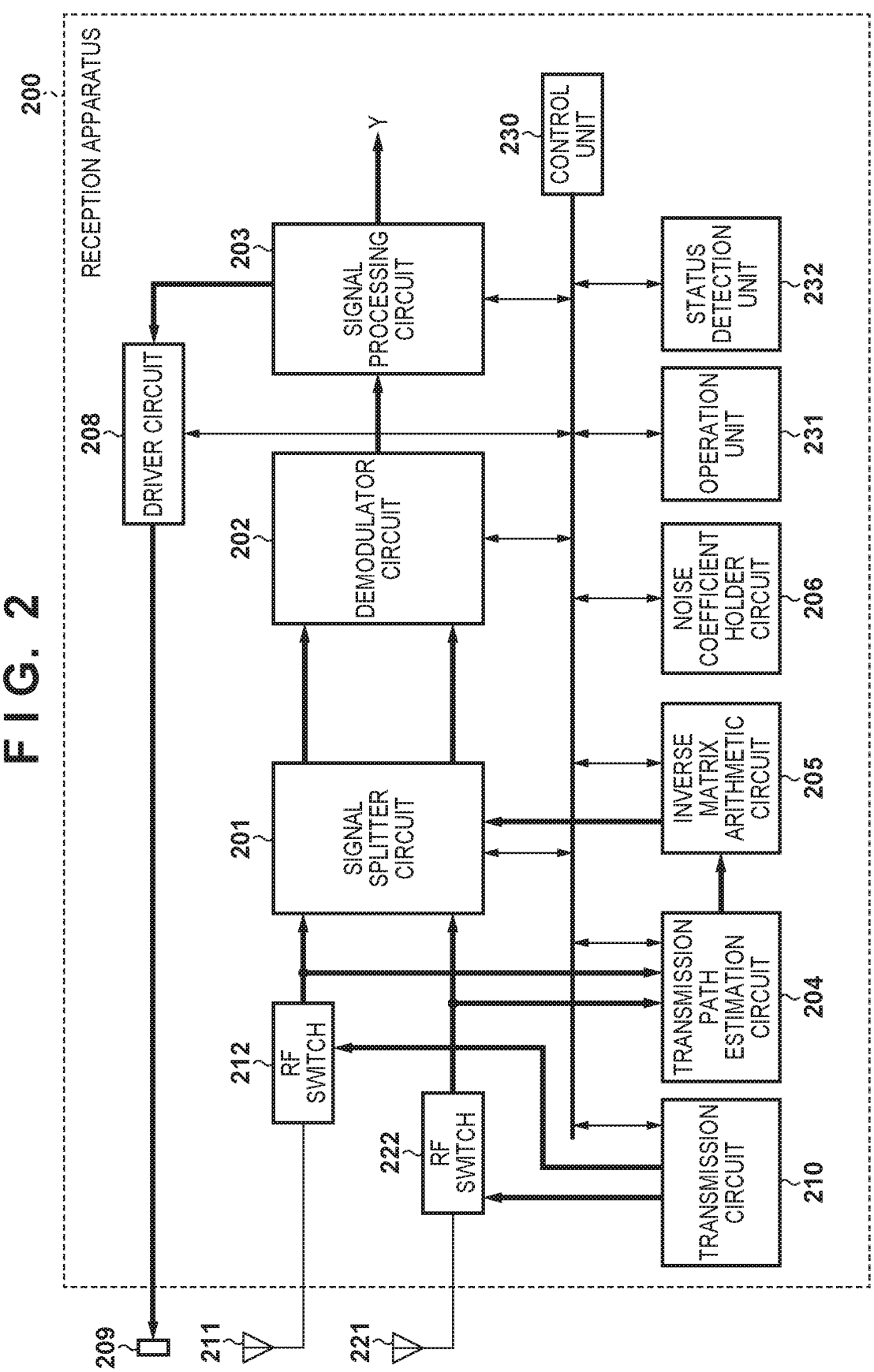
FIG. 2 is a block diagram showing the configuration of a reception apparatus according to the first embodiment.
Figure 3:
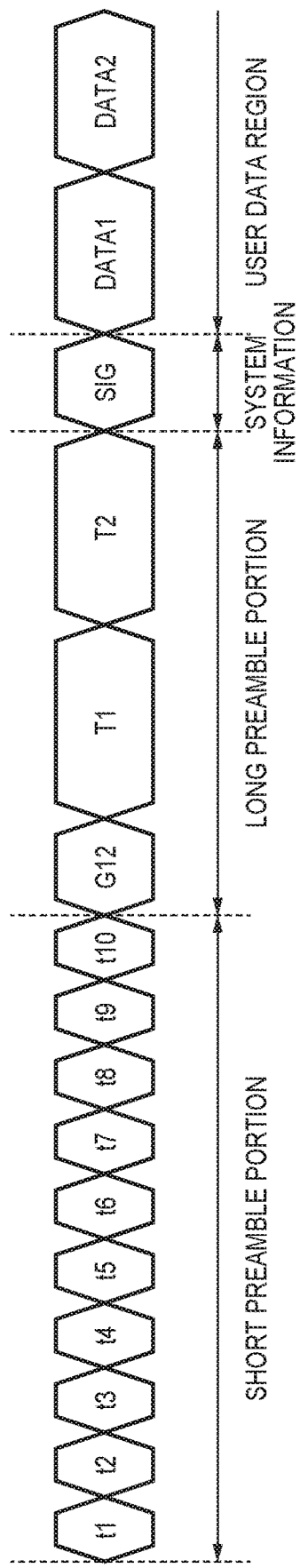
FIG. 3A is a view showing an example of a training signal according to the first embodiment.
FIG. 3B is a view showing an example of a table of noise coefficients according to the first embodiment.
Figure 6:
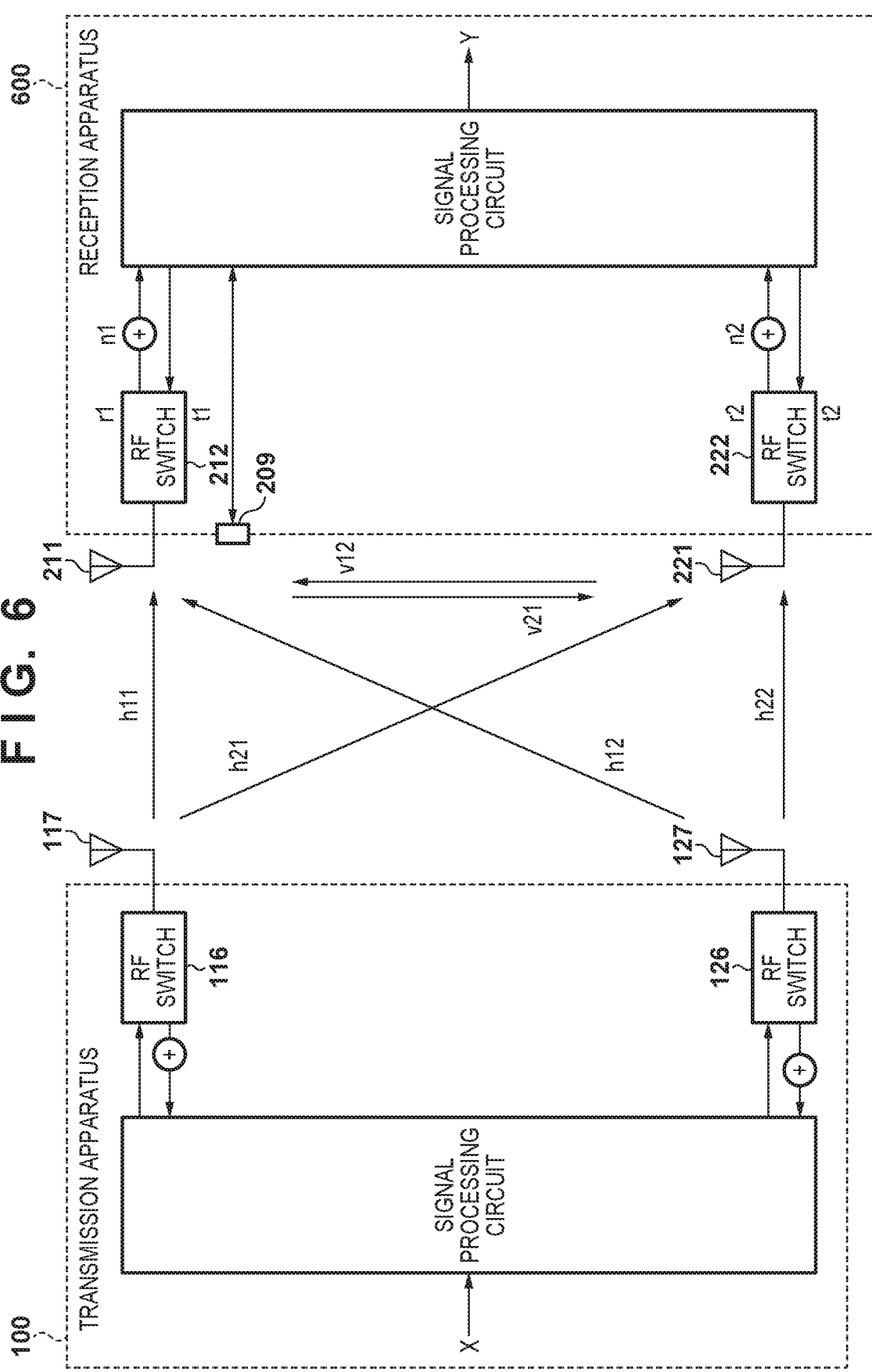
FIG. 6 is a diagram showing the system configuration according to a second embodiment of the present invention.

With respect to the transmission apparatus 100 and the reception apparatus 600 shown in FIG. 6, like components as in FIGS. 1 and 2 are denoted with like reference symbols, and the internal configurations between the signal processing circuits and the RF switches are omitted from the figure.

Let t1($t$) and t2($t$) be the transmission signals from the antenna 211 and 221 of the reception apparatus 600, respectively, and let r1($t$) and r2($t$) be the reception signals inputted to the antenna 211 and 221, respectively, then, the transmission signal vector T, the reception signal vector R, and the noise vector N can be represented as follows:

$$T(t)=[t1(t),t2(t)]^T$$

$$R(t)=[r1(t),r2(t)]^T$$

$$T(t)=[n1(t),n2(t)]^T$$

The system operation can be modeled by the expression (16), where V denotes the transfer function representing the characteristics of the transmission paths between the antenna 211 and the antenna 221 of the reception apparatus 600:

$$R(t)=V \cdot T(t)+N(t) \qquad (\text{Exp. 16})$$

In this case, as the attenuation of the signals along the transmission paths between the antennas 211 and 221 can be ignored, V=[v12,v21]T≈[1,1]T, giving the expression (17):

$$N(t)=R(t)-T(t) \qquad (\text{Exp. 17})$$

Given the expression (17), the noise vector N(t) can be obtained by the difference between the reception signal vector R(t) of the training signal between the antennas 211 and 221 of the reception apparatus 600 and the transmission signal vector T(t).

<Description of Noise Vector>

Figure 7:
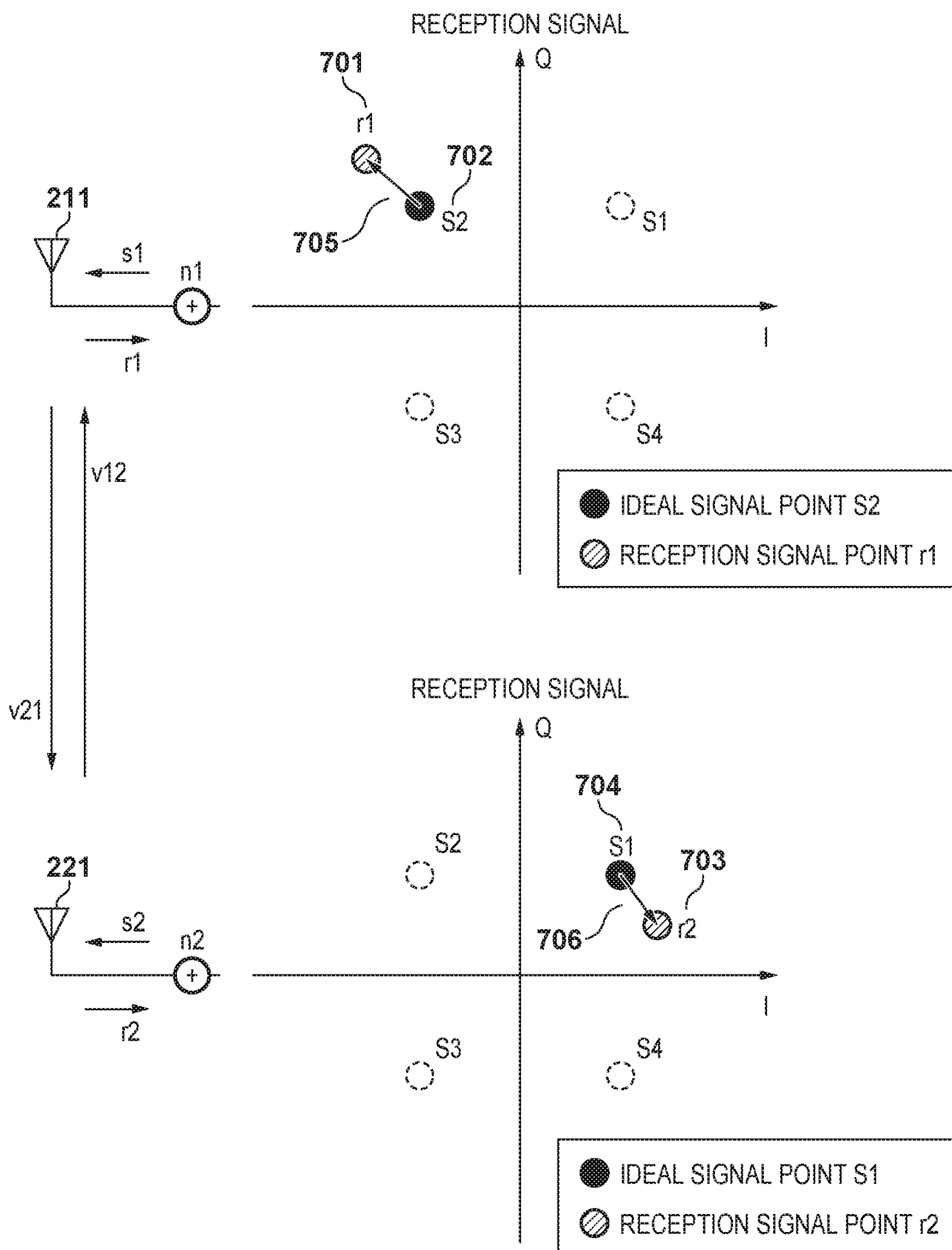
FIG. 7 is a chart showing the processing to separate noise components performed by the reception apparatus of the second embodiment.

The following describes the processing to separate the noise components when a training signal is sent and received by the antennas 211 and 221 of the reception apparatus 600 according to the second embodiment with reference to FIG. 7.

FIG. 7 illustrates a spatial constellation of the received signal points when a transmission signal s1 is transmitted from the antenna 211 and a transmission signal s2 is transmitted from the antenna 221 by QPSK (quadrature phase-shift keying) and the reception signal r1($t$) and the reception signal r2($t$) are affected by the internal device noise. In FIG. 7, the expression (17) is applied to the signal point 701 of the reception signal r1($t$), the ideal signal point 702 of the transmission signal s2 with a transmission path characteristic v12, the signal point 703 of the reception signal r2($t$), and the ideal signal point 704 of the transmission signal s2 with a transmission path characteristic v21, This provides the noise vectors 705 and 706 of the antennas 211 and 221, respectively.

<Transmission and Reception Timing>

The transmission and reception timing in the system of the second embodiment will be described hereinafter with reference to FIGS. 8A and 8B.

In this embodiment, the RTS (Request to Send)/CTS (Clear to Send) protocol is used to determine whether or not a channel bandwidth for transmission and reception is available.

In FIG. 8A, the transmission apparatus 100 transmits an RTS in a PPDU (PLCP Protocol Data Unit) frame to verify that a channel near the apparatus is clear (at times t0 and t4). Upon receiving the RTS, the reception apparatus 600 returns a CTS as a reply if it can receive data (at times t1, t2, t5, and t7).

The transmission apparatus 100 transmits RTS's from the antennas 117 and 127, and the reception apparatus 600 returns a CTS to the antennas 117 and 127 as a reply to each RTS.

An RTS corresponds to the frame including the preamble portions shown in FIGS. 3A and 3B of the first embodiment and includes a packet called a sounding packet that is used by the reception apparatus 600 to estimate the status of the transmission paths.

Furthermore, in addition to sending a CTS packet, the reception apparatus 600 returns Channel State Information (CSI) obtained by the reception apparatus 600 in concatenation with the CTS packet to allow the transmission apparatus 100 to ascertain the status of the transmission paths.

The transmission apparatus 100 acquires a transfer path matrix (corresponding to the transfer function H of the first embodiment) from the CSI feedback packet returned by the transmission apparatus 600 and performs digital signal processing called Singular Value Decomposition (SVD) to decide the transmission power for each antenna.

In FIG. 8A, after returning a CTS packet, the reception apparatus 600 transmits a training symbol as a signal to determine the phase and the amplitude of the internal device noise between the antennas 211 and 221 of the reception apparatus 600 (at times: t3 and t6).

In this embodiment, the signal to determine the internal device noise will be referred to as a Self-Training Symbol (STS) hereinafter, and the transmission of an STS between the antennas of the reception apparatus 600 will be referred to as self-training (ST) hereinafter.

While CTS's and CST's are transmitted by time-division multiplexing in FIG. 8A, it is also possible to simultaneously transmit replies from the antennas 211 and 221 by space division multiplexing as shown in FIG. 8B. Even in this case, STS's transmitted by each antenna are transmitted by time-division multiplexing.

<Apparatus Configuration>

Next, the configuration and function of the reception apparatus 600 of the second embodiment will be described with reference to FIGS. 9 and 10A-B.

As the configuration of the transmission apparatus 100 of the second embodiment is the same as that of the first embodiment shown in FIG. 1, description thereof is omitted.

The reception apparatus 600 of the second embodiment includes a condition acquisition circuit 901, an ST processing circuit 902, and a noise vector extraction circuit 903 in addition to the configuration of the first embodiment shown in FIG. 2.

Upon receiving data from the antennas 211 and 221, the condition acquisition circuit 901 acquires and outputs the communication conditions of the transmission apparatus 100 to the control unit 230. The control unit 230 stores the acquired communication conditions in the RAM.

The ST processing circuit 902 generates and outputs STS's to the transmission circuit 904. Additionally, the ST processing circuit 902 determines the transmission settings based on the communication conditions of the transmission apparatus 100 stored in the RAM of the control unit 230 and notifies the transmission circuit 904 of the transmission settings.

The noise vector extraction circuit 903 extracts the noise vectors described in FIGS. 7, 8A and 8B.

The transmission circuit 904 transmits STS's from the antenna 211 or the antenna 221 via the RF switches 212 or 222, respectively, on the ST processing conditions given by the ST processing circuit 902. The ST processing conditions will be described below.

The second noise specifying processing in the reception apparatus 600 according to the second embodiment will be described hereinafter with reference to FIGS. 10A and 10B.

Figure 10A:
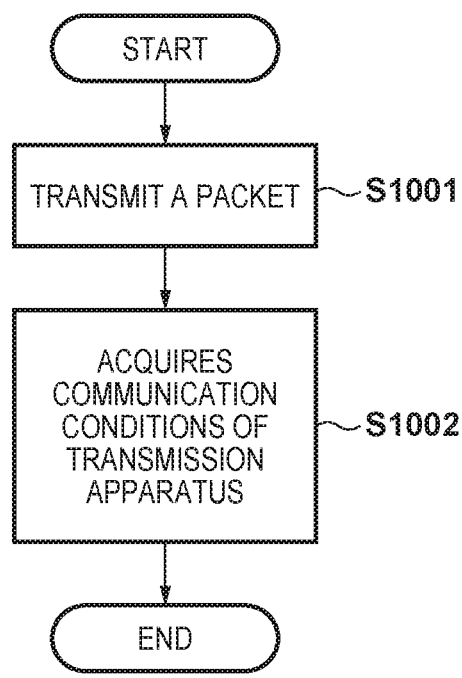
FIGS. 10A and 10B are flowcharts showing the noise specifying processing by the reception apparatus of the second embodiment.
Figure 10B:
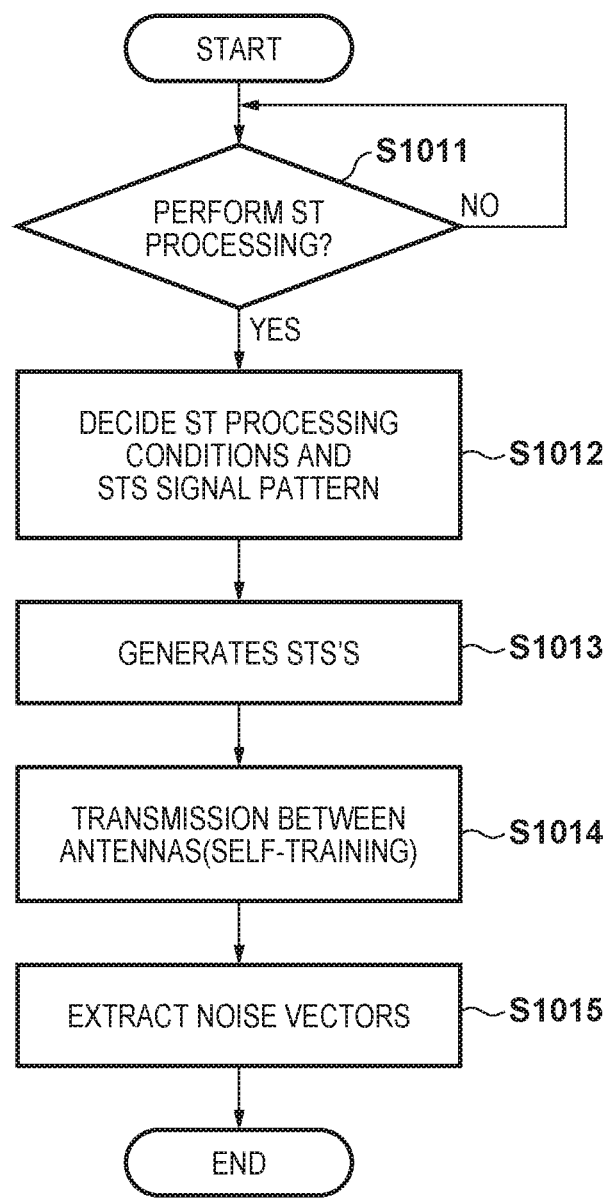

The processes shown in FIGS. 10A and 10B are performed every time the power to the transmission apparatus 100 and the reception apparatus 600 is turned on, or the communication function is activated, or data is transmitted from the transmission apparatus 100 to the reception apparatus 600.

In Step S1001, the transmission apparatus 100 transmits a sounding packet that includes an RST from the antenna 117 and 127.

In Step S1002, the condition acquisition circuit 901 of the reception apparatus 600 acquires the communication conditions of the transmission apparatus 100 from the data received by the antennas 211 and 221. As used herein, the communication conditions refer, for example, to information, such as the signal strength at the time of reception that is calculated based on the transfer function acquired from the reception signal from the transmission apparatus 100 (RSSI: Received Signal Strength Indication), information about the channel used for data transmission, and MCS (Modulation and Coding Scheme) information. As used herein, MCS information refers to all the patterns classified by indexing that include the modulation method, the coding rate, the number of streams, and the data rate so as to allow the reception apparatus 600 to acquire the communication conditions of the transmission apparatus 100 from the MSC information.

The reception apparatus 600 performs the processing of FIG. 10B after the processing of FIG. 10A.

In Step S1011, the ST processing circuit 902 determines whether or not to perform ST processing based on the change in the status of the reception apparatus 600 detected by the status detection unit 232. The ST processing circuit 902 performs ST processing if any of the exemplary conditions (1)-(10) given below occurs. When any of the exemplary conditions given below occurs, the noise distribution in the reception apparatus becomes constantly uneven with respect to the antennas or there is a possibility that such an uneven noise distribution may occur.

(1) Immediately after system startup: For example, after power is turned on to the transmission apparatus 100 or the reception apparatus 600 and before self-training is performed.

(2) Immediately after the activation of the network function: For example, after the network function is enabled, for example, by user operation of the transmission apparatus 100 or the reception apparatus 600 and before self-training is performed.

(3) If a change in the transfer function H is detected: For example, if a change in the condition of the propagation path near an antenna is detected due to the opening or closing of a movable display panel. Note that any method may be employed to detect the opening or closing of the panel. Examples include a method of using a sensor that can detect the opening or closing of the movable display panel or a method of detection based on a change in the transfer function due to the transmission of a sounding packet from the transmission apparatus.

(4) When the operation mode of the reception apparatus is changed: For example, the noise distribution in the affected apparatus changes when the user operation is performed to switch the shooting mode from RID with 1920× 1080 to 4K UHDTV with 3840×2160/4096*2160 or 8K UHDTV with 7680×4320, when the operating frequency of the video signal of SDI is switched, or when the operating frequency of the vide signal is switched.

(5) If there is a change in the connecting location of an external connection member or the location of the terminal used: For example, if there is a change in the connecting location of the video terminal or the location of the terminal used due to user operation, the location of the noise source changes, thus changing the noise distribution in the affected apparatus.

(6) When the video input/output terminal mode of the reception apparatus is changed: For example, when the operating frequencies of the signals inputted and outputted at the video terminal of SDI/HDMI, etc., the noise distribution in the affected apparatus changes. Professional video cameras has a function called GenLock (Generator Lock) that receives a video signal from an SDI or other terminal or a signal from a SYNC signal generator, and synchronizes the image from the camera with an external signal using the received signal as the reference signal. In this case, the operating frequency of a transceiver circuit (not shown) is switched in the video signal processing according to the operating frequency of the input signal. As the operating frequency for the recovery clock is switched over, the noise distribution in the affected apparatus is changed.

(7) If the write/read speed of the record medium is greater than or equal to a predetermined speed: For example, if the communication speed of the memory card set in the camera is greater than or equal to a predetermined speed, the noise distribution in the affected apparatus changes. In this embodiment, for example, it can be determined that the communication speed is greater than or equal to a predetermined speed if the version information of the memory card is greater than or equal to a predetermined version.

(8) If an error rate of the reception data has continued for a predetermined period: For example, when it is detected that an error rate greater than or equal to a predetermined rate has continued for a predetermined period by accumulating statistics of the error rate of the reception data acquired by the demodulator circuit of the reception apparatus.

(9) If a temperature change greater than or equal to a predetermined value has occurred during a predetermined period of time: For example, if a temperature change greater than or equal to a predetermined value is detected during a predetermined period of time, with a temperature sensor provided in the reception apparatus that can directly or indirectly measure or estimate the temperature adjacent to an antenna.

(10) When a predetermined time cycle has elapsed while the power is on: For example, when it is detected that a predetermined time has elapsed since the execution of the previous self-training.

Furthermore, in this embodiment, when the temperature is low (for example, 5'C), self-training is performed more often than during a normal temperature period (5-35° C.). This is because it is determined empirically that antennas are more susceptible to noise under a low temperature condition than under a normal temperature condition. By increasing the frequency of self-training only under a low temperature condition, occupation of the communication period by self-training can be avoided so as to prevent negative effect on other types of communication.

In Step S1011, if determining that ST processing is to be performed, the ST processing circuit 902 moves to Step S1012.

The reception apparatus 600 performs the processing from Steps S1012-S1015 for each of the antennas 211 and 221.

In Step S1012, the ST processing circuit 902 decides the ST processing conditions and the signal pattern of the STS's. The method for deciding the ST processing conditions and the signal pattern of the STS will be described below.

In Step S1013, the ST processing circuit 902 generates STS's based on ST processing conditions and the signal pattern determined in Step S1012 and outputs them to the transmission circuit 904.

In Step S1014, the transmission circuit 904 transmits and receives STS's between the antennas 211 and 221 based on ST processing conditions and the STS's decided and generated by the ST processing circuit 902.

In Step S1015, the noise vector extraction circuit 903 extracts the noise vectors of the antennas 211 and 221 by the method described in FIGS. 6 and 7.

<Method for Deciding ST Processing Conditions>

Next, the method for deciding ST processing conditions in Step S1012 of FIG. 10B will be described hereinafter.

The control unit 230 stores, as the communication conditions for the transmission apparatus 100, a table in advance that contains combinations of the number of streams, the modulation method, the coding rate, etc., with respect to the MCS Index shown in FIG. 11, FIG. 11 shows an excerpt of part of the MCS Index.

The ST processing circuit 902 checks the MCS Index acquired by the condition acquisition circuit 901 from a reception signal with the table shown in FIG. 11 to decide the communication conditions that corresponding to the Index as the ST processing conditions.

The ST processing circuit 902 additionally decides, from the reception signal, the channel information and the received signal strength indicator (RSSI) used by the transmission apparatus 100 as the ST processing conditions. That is, the ST processing conditions of the reception apparatus 600 correspond to the channels (frequency bandwidths), the modulation method, and the received signal strength indicator (RSSI) used by the transmission apparatus 100 to transmit data to the reception apparatus 600. For example, if the transmission apparatus 100 uses channels 36-48 for W52 and the 64-QA modulation method and if the received signal strength indicator at the reception apparatus is −90 dB, the ST processing conditions are set to control the transmission power so that the signal strength at the time of transmission is the same in the aforementioned channels and by the modulation method. In this way, by applying conditions similar to the communication conditions of the transmission apparatus 100 as the ST processing conditions, the effect of noise on the reception signals when data is transmitted from the transmission apparatus 100 to the reception apparatus 600 can be detected on more proximate conditions.

<Method for Deciding Signal Pattern>

Next, the method for deciding the STS signal pattern in Step S1012 of FIG. 10B will be described hereinafter.

Figure 12B:
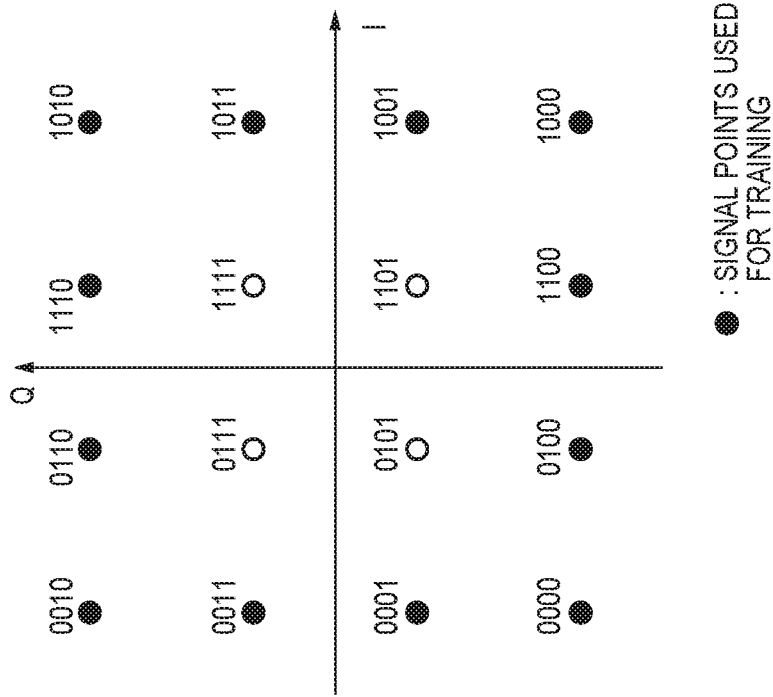
FIGS. 12A and 12B are diagrams describing the training signal pattern of the second embodiment.
Figure 12A:
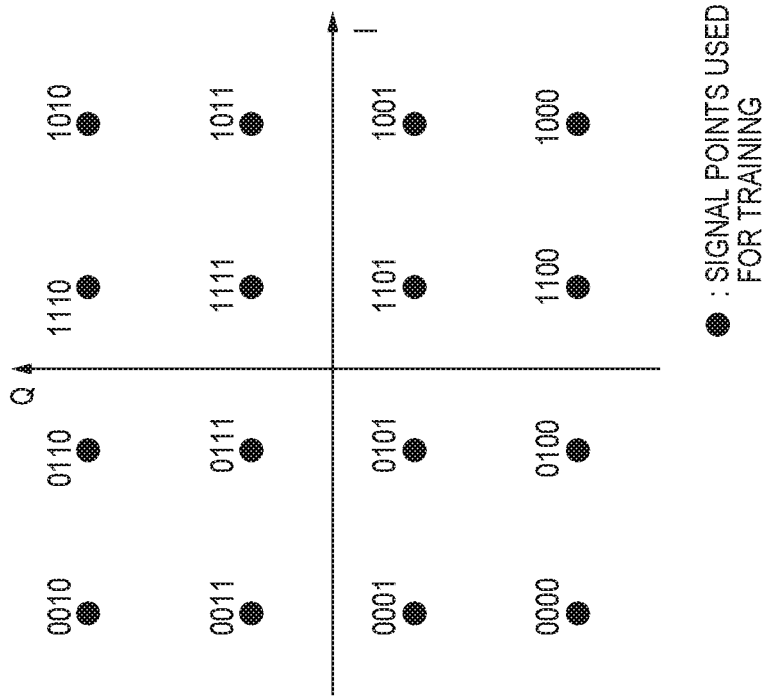

The following describes an exemplary method for deciding the STS signal pattern based on 16-QAM (Quadrature Amplitude Modulation) as shown in FIGS. 12A and 12B.

If the number of antennas of the reception apparatus is N and the number of points in the spatial constellation of the modulating signals is, for example, 16-QAM, self-training needs to be performed 16×N times as shown in FIG. 12A. For example, in this embodiment, as the number of antennas is 2, self-training needs to be performs 16×2 times. Note that self-training needs to be completed within a code period. Among the conditions (1)-(10), training that takes a relatively long period does not cause problems during the condition (1), which occurs immediately after system startup, and the condition (2), which occurs immediately after the activation of the network function. However, during normal operation, such as when any of the conditions (3)-(10) occurs, self-training may interfere with normal transmission and reception processing. Accordingly, in this embodiment, during the normal operating conditions (3)-(8) in particular, training is prioritized for part of the signal points among all the spatially constellated signal points as shown in FIG. 12B.

In this case, the aforementioned part of the signal points is the ones with the largest amplitude in the same phase among all the spatially constellated signal points. For example, among the signals shown in FIG. 12B, the signal points denoted by black dots are used as training signals. By selecting the signal points denoted by black dots in FIG. 12B, it is possible to determine the internal device noise with signal points having a good S/N ratio in the same phase.

FIG. 13 shows an exemplary STS packet configuration according to the second embodiment. The signal points used in the above-described self-training are concatenated and then transmitted and received between the antennas 211 and 221 of the reception apparatus 600 as a known transmission signal.

As described above, according to this embodiment, by performing self-training between the antennas of the reception apparatus, the noise vectors in the apparatus can be obtained, and ideal signals can be calculated from the differences between the signals received from the transmission apparatus and the noise vectors.

Moreover, the noise ratio is calculated from the phase and the amplitude of the noise vector of each antenna calculated in this embodiment and is provided to the transmission apparatus 100 by the reception apparatus 600. As in the first embodiment, the transmission apparatus 100 may also control the transmission power outputted from each of the transmission antennas according to the noise ratio.

In addition, by multiplying the transfer function calculated by the reception apparatus 600 by the noise ratio, it is possible to obtain a transfer function that factors in the noise ratio and to enhance the accuracy of the beam forming by the transmission apparatus 100 by notifying the transmission apparatus 100 of the transfer function.

Furthermore, as in the first embodiment, noise coefficients may be held in a manner that allow these coefficients to be updated according to the magnitudes of the noise vectors detected in this embodiment.

In this embodiment, the STS signal pattern uses the signal points with the largest amplitude in the same phase in the spatially constellated signal points. The purpose of this is to perform training in all the phases by selecting at least one signal point from those in the same phase. Accordingly, the present invention is not limited to the above, and any alternative method may be employed as long as it does not depart from the forgoing purpose.

Rather than performing self-training using signal points in all the phases, self-training may be performed on signal points in a plurality of phases so that phase interpolation may be performed using the results to estimate the result of training.

As described above, according to this embodiment, STS's are transmitted and received between the antennas of the reception apparatus. However, the noise vector of the antenna more susceptible to the effect of the noise may alternatively be calculated through self-training. Furthermore, it is also possible to specify in advance which antenna will receive training by storing in advance information about the antenna that is affected depending on the locations of the plurality of external connection members 209. In this way, compared with the case in which training is performed on all the antennas, the training takes half the time to enhance the accuracy of the signal reception by the antenna more affected by the noise although the accuracy of the signal extraction is reduced.

In this embodiment, the ST processing conditions are the transmission conditions of the transmission apparatus 100. Alternatively, for example, frequency bandwidths that are affected during the input and output of SDI and other video signals may be empirically obtained and saved in advance so that self-training may be prioritized for these more frequency bandwidths and channels that are affected. In other words, it is possible to store in advance information about the channels that may be affected according to the operating mode of the reception apparatus 600 so that self-training may be prioritized for the applicable channels. By prioritizing training for the frequency bandwidths and channels that are affected, it is possible to enhance the accuracy of the signal reception by the channels strongly affected by noise without performing self-training on all the channels due to time constraints.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-215897, filed Nov. 8, 2017 which is hereby incorporated by reference herein in its entirety.

What is claimed is:

1. A communication apparatus having a plurality of antennas, the communication apparatus comprising:
   a communication unit configured to communicate with an external apparatus with the plurality of antennas;
   a detection unit configured to detect a status of the communication apparatus; and
   a specifying unit configured to specify a noise component mixed in signals received from the external apparatus according to the status of the communication apparatus.

2. The apparatus according to claim 1, wherein the specifying unit performs at least one of a first noise specifying processing to obtain the noise component by transmitting and receiving a predetermined signal between the specifying unit and the external apparatus and a second noise specifying processing to obtain the noise component by transmitting and receiving the predetermined signal among the antennas of the communication apparatus.

3. The apparatus according to claim 2, further comprising a control unit configured to perform controlling the second noise specifying processing after performing the first noise specifying processing.

4. The apparatus according to claim 2, wherein the specifying unit comprises:
   an estimation unit configured to estimate a transfer function that represents a characteristic of a transmission path between the communication apparatus and the external apparatus;
   a holding unit configured to hold a noise coefficient that represents a ratio of the noise component mixed in the received signals for each of the plurality of antennas;
   a calculation unit configured to calculate a noise ratio among the plurality of antennas based on the noise coefficient and the transfer function; and
   a transmission unit configured to transmit the noise ratio to the external apparatus,
   wherein the specifying unit performs the first noise specifying processing.

5. The apparatus according to claim 4, wherein the noise coefficient includes a value according to a bandwidth of the communication unit.

6. The apparatus according to claim 4, wherein the noise coefficient includes a value according to a connection status or a signal input and output status of an external connection unit provided in the communication unit.

7. The apparatus according to claim 6, wherein the calculation unit recalculates the noise ratio upon detection of a change in the connection status or the signal input and output status of the external connection unit.

8. The apparatus according to claim 4, wherein the noise coefficient includes a value according to a presence or absence of a recording medium removably inserted with respect to the communication apparatus.

9. The apparatus according to claim 8, wherein the noise coefficient includes a value according to a communication speed of the recording medium.

10. The apparatus according to claim 9, wherein the calculation unit recalculates the noise ratio upon detection of a change in the presence or absence or the communication speed of the recording medium.

11. The apparatus according to claim 4, wherein the calculation unit calculates the transfer function as the noise ratio when the ratio among the noise coefficients of the plurality of antennas is smaller than 1.

12. The apparatus according to claim 4, wherein the external apparatus comprises:
    a plurality of antennas;
    a generation unit configured to generate the predetermined signal; and
    a transmission unit configured to transmit the predetermined signal via the plurality of antennas.

13. The apparatus according to claim 4, wherein the external apparatus controls a transmission power from each of the plurality of antennas based on the noise ratio so that the ratio of the noise component to the signal transmitted from each antenna becomes the same.

14. The apparatus according to claim 2, wherein the specifying unit comprises:
    a generation unit configured to generate the predetermined signal; and
    a processing unit configured to perform processing to transmit and receive the predetermined signal among the plurality of antennas when the status of the communication apparatus has changed; and
    an extraction unit configured to extract noise vectors unevenly distributed within the communication apparatus based on the predetermined signal and a received signal that receive the predetermined signal; and
    wherein the specifying unit performs the second noise specifying processing.

15. The apparatus according to claim 14, further comprising a storage unit configured to store processing conditions for performing the second noise specifying processing, the processing conditions corresponding to communication conditions of the external apparatus,
    wherein the processing unit decides the processing conditions based on the communication conditions of the external apparatus.

16. The apparatus according to claim 14, wherein the status of the communication apparatus changes immediately after a startup of the communication apparatus or immediately after activation of a communication function of the communication apparatus.

17. The apparatus according to claim 14, wherein the status of the communication apparatus changes when a characteristic of a transmission path between the communication apparatus and the external apparatus changes.

18. The apparatus according to claim 14, wherein the status of the communication apparatus changes when an operation mode of an external connection unit provided in the communication apparatus changes.

19. The apparatus according to claim 14, wherein the status of the communication apparatus change when a communication speed of a recording medium connected to the communication apparatus is greater than or equal to a predetermined speed.

20. The apparatus according to claim 14, wherein the status of the communication apparatus changes when a switch is made to any of a plurality of external connection units.

21. The apparatus according to claim 14, wherein the status of the communication apparatus changes when an error rate greater than or equal to a predetermined rate has continued in the received signal for a predetermined period.

22. The apparatus according to claim 14, wherein the status of the communication apparatus changes when a temperature of the communication apparatus is higher than or equal to a predetermined temperature.

23. The apparatus according to claim 14, wherein the predetermined signal is transmitted and received so that the signal strength at a time of reception is the same as the signal strength at a time of transmission among the plurality of antennas.

24. The apparatus according to claim 14, wherein the predetermined signal is transmitted and received in the same bandwidth as that for communicating with the external apparatus.

25. The apparatus according to claim 14, wherein the generation unit generates the predetermined signal using all or part of the signal points of the received signals that are spatially constellated based on a predetermined modulation method.

26. The apparatus according to claim 25, wherein the generation unit generates the predetermined signal utilizing the signal points with the largest amplitude in the same phase among all the signal points of the received signals that are spatially constellated.

27. A non-transitory computer-readable storage medium storing a program for causing a computer to function as a communication apparatus having a plurality of antennas, the communication apparatus comprising:
- a communication unit configured to communicate with an external apparatus with the plurality of antennas;
- a detection unit configured to detect a status of the communication apparatus; and
- a specifying unit configured to specify a noise component mixed in signals received from the external apparatus according to the status of the communication apparatus.

\* \* \* \* \*